United States Patent [19]

Smith

[11] Patent Number: 5,778,160

[45] Date of Patent: Jul. 7, 1998

[54] LIQUID INK PRINTING SYSTEM HAVING REGION-DEPENDENT IMAGE PROCESSING

[75] Inventor: Eric W. Smith, Rochester, N.Y.

[73] Assignee: Xerox Corporation, Stamford, Conn.

[21] Appl. No.: 719,238

[22] Filed: Sep. 24, 1996

[51] Int. Cl.⁶ .............................. G06K 1/00; H04N 1/46
[52] U.S. Cl. .......................... 395/109; 395/102; 395/106; 358/500; 358/518; 358/537; 358/538; 382/164; 382/165; 382/190
[58] Field of Search ..................... 395/102, 106, 395/109; 382/190, 224, 164, 165, 178, 180; 358/500, 530, 518, 524, 537, 538

[56] References Cited

U.S. PATENT DOCUMENTS

| | | | |
|---|---|---|---|
| 5,029,224 | 7/1991 | Fujisawa | 382/22 |
| 5,247,583 | 9/1993 | Kato et al. | 382/9 |
| 5,287,204 | 2/1994 | Koizumi et al. | 358/538 |
| 5,475,800 | 12/1995 | Vaughn | 395/109 |
| 5,513,282 | 4/1996 | Williams | 382/303 |
| 5,565,886 | 10/1996 | Gibson | 345/136 |
| 5,625,711 | 4/1997 | Nicholson et al. | 382/224 |

Primary Examiner—Edward L. Coles
Assistant Examiner—Mark Wallerson
Attorney, Agent, or Firm—Daniel J. Krieger

[57] ABSTRACT

A liquid ink printing method having region dependent image processing for printing a color image with a liquid ink printer, having a printhead, from image information generated by an image source. The method includes generating a plurality of bitmaps from the image information, examining a corresponding portion of each of the plurality of bitmaps for color information, and applying color image processing to only the examined corresponding portion having color information. The method of printing, including region dependent image processing, improves performance of complex image processing operations by detecting and tagging portions of an image which require the complex image processing operations. Only those regions that require complex image processing operations are processed according to those processes and other information, such as text, are not processed.

8 Claims, 6 Drawing Sheets

LIQUID INK PRINTING SYSTEM HAVING REGION-DEPENDENT IMAGE PROCESSING

FIELD OF THE INVENTION

This invention relates generally to a printing system and more particularly to region-dependent image processing for a liquid ink printer.

BACKGROUND OF THE INVENTION

Liquid ink printers of the type frequently referred to as continuous stream or as drop-on-demand, such as piezoelectric, acoustic, phase change wax-based, or thermal, have at least one printhead from which droplets of ink are directed towards a recording medium. Within the printhead, the ink is contained in a plurality of ink carrying conduits or channels. Power pulses cause the droplets of ink to be expelled as required from orifices or nozzles at the ends of the channels.

In a thermal ink-jet printer, the power pulse is usually produced by a heater transducer or a resistor, typically associated with one of the channels. Each resistor is individually addressable to heat and vaporize ink in the channels. As voltage is applied across a selected resistor, a vapor bubble grows in the associated channel and initially bulges toward the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print color and/or monochrome images received from an image output device or document creator such as a personal computer, a scanner, or a workstation. The color images printed are produced by printing with several colored inks or colorants of different colors at a time. The color of the ink and amount of ink deposited by the printer is determined according to image information received from the document creator. The document creator provides an input digital gray-scale image, which is either defined in monochromatic terms, colorimetric terms, or both. The amount of gray level is typically defined by an input pixel value ranging from 0 to 255, where 0 is equal to white, 255 is equal to black, and value therebetween are shades of gray. Commonly this description may be part of a Page Description Language (PDL) file describing the document. In the case of computer generated images, colors defined by the user at the user interface of a workstation can be defined initially in color space of tristimulus values. These colors are defined independently of any particular device, and accordingly reference is made to the information as being "device independent".

The printer, on the other hand, has an output which is dependent on the device or "device dependent". This dependency is due, in part, to the fact that while the input digital gray scale image includes pixels having a wide range of gray scale values, the output image generated by the printer is a binary image formed from a plurality of ink drops or spots wherein the absence of a spot defines the level of white and the presence of a spot defines black. Consequently, a transformation must be made from the input digital gray scale image to the printed binary image since the binary image includes binary information which either has a gray level value of zero (white) or one (black), but not levels of gray therebetween. These transformations, from an input image to an output image, are made with a number of known algorithms, including an algorithm known as the error diffusion algorithm which converts the input gray scale image into high frequency binary texture patterns that contain the same average grayscale information as the input image.

Color printers also include an output which can be defined as existing in a color space called CMYK (cyan-magenta-yellow-key or black) which is uniquely defined for the printer by its capabilities and colorants. Such printers operate by the addition of overlapping multiple layers of ink or colorant in layers to form a page. These multiple layers are derived from the PDL description of a page which is decomposed into multiple color planes or bitmaps, each plane or bitmap corresponding to C, M, Y, and K.

Because liquid inks are used, certain ink related problems arise, including intercolor bleed where inks of different colors come in contact with one another and bleed together. Likewise, some inks do not always provide for optimum color rendition of a desired image. Consequently, to achieve a desired color response the image must be supplemented with additional inks, for instance, to increase the optical density. In certain other instances, it is desirable to reduce the amount of ink when the amount of ink is too great resulting in drying problems. In these and other known instances, the C, M, Y, and K image bitmaps are altered or modified to achieve the desired output. Such modifications, however, can be time consuming resulting in reduced throughput of the printing system.

Various printers and methods for printing images on a recording medium are illustrated and described in the following disclosures which may be relevant to certain aspects of the present invention.

U.S. Pat. No. 5,029,224 to Fujisawa describes a marked region recognition apparatus which recognizes an arbitrary marked region of a document image from a marked signal which indicates whether or not there exists a mark which indicates the marked region. The marked region recognition apparatus uses an output image data of an image reader which makes a scan at a predetermined direction to read an arbitrary region of a document image which is indicated by a mark.

U.S. Pat. No. 5,247,583 to Kato et al., describes an image segmentation method and apparatus. An image processing area is divided into a plurality of small areas which are allowed to overlap one another. One or a plurality of pixels in a region to be segmented and in a region not to be segmented are specified. By processing, a particular region can be segmented out of the region.

U.S. Pat. No. 5,513,282 to Williams, describes a method and apparatus for controlling the execution of image processing operations carried out on an array of image signals, the specific operations having been identified by a plurality of predefined windows. The windows are divided into a plurality of regions, the boundaries of which correspond to transitions from one region to another.

SUMMARY OF THE INVENTION

In accordance with one aspect of the present invention, there is provided a method of printing a color image with a printer from image information generated by an image source. The method includes generating a plurality of bitmaps from the image information, examining a corresponding portion of each of the plurality of bitmaps for color information, applying color image processing to only the examined corresponding portion having color information and printing the color image according to the applied color image processing.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
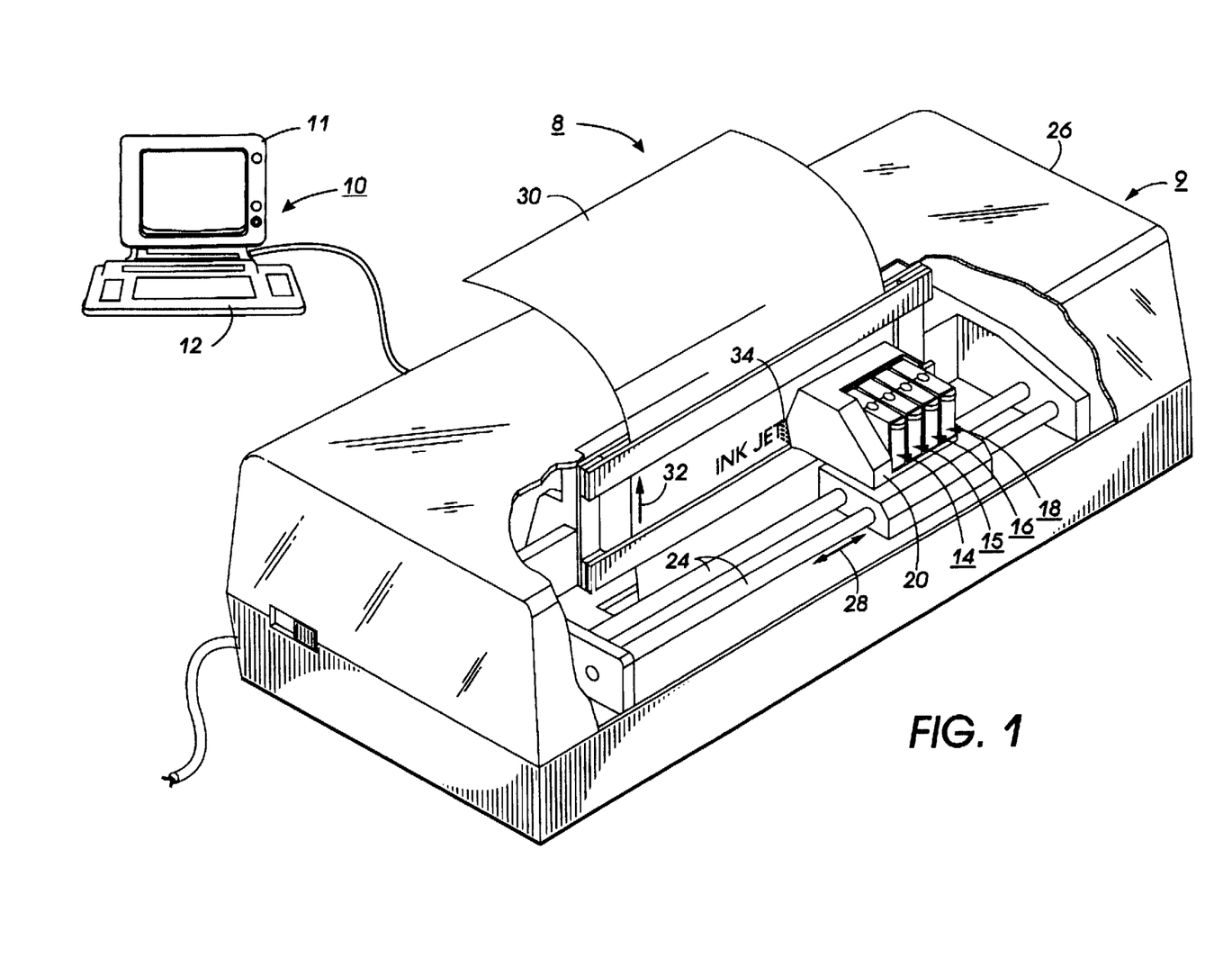
FIG. 1 illustrates a perspective view of a color ink-jet printing system incorporating an ink jet printer and a personal computer.

FIG. 1 illustrates a perspective view of a color thermal ink jet printing system 8 which incorporates region-dependent image processing of the present invention. An ink jet printer 9 is coupled to an personal computer 10, including a monitor 11 and a keyboard 12, which provides image information to the printer 9 for printing. While the ink jet printer 9 is illustrated, other liquid ink printers are also within the scope of the invention. Printer 9 includes four ink jet printhead cartridges 14, 15, 16, and 18 detachably mounted in a housing 20 attached to a carriage 22 supported by carriage rails 24. The carriage rails 24 are supported by a frame 26 of the ink jet printer 9. The carriage 20 moves in a scanning direction 28 reciprocating across a recording medium 30, such as a sheet of paper or a transparency, which is advanced in a direction 32 for printing. Each printhead cartridge includes an ink container holding ink, including cyan, magenta, yellow and/or black for supply to a thermal ink jet printhead which selectively expels droplets of ink under control of electrical signals received from a controller (not shown) of the printer 9 through an electrical cable (not shown).

As the carriage 22 reciprocates back and forth across the recording medium 30, droplets of ink are expelled from selected ones of a plurality of printhead nozzles of a printhead 34 in a swath. The nozzles, also known as ink ejecting orifices, are typically arranged in a linear array substantially perpendicular to the scanning direction 28. During each pass of the carriage 22, the recording medium 30 is held in a stationary position. At the end of each pass, however, the recording medium is stepped by a stepping mechanism under control of the printer controller in the direction of the arrow 32. For a more detailed explanation of the printhead and printing thereby refer to U.S. Pat. No. 4,571,599 and U.S. Pat. No. Re. 32,572, the relevant portions of which are incorporated by reference.

Each of the printhead cartridges 14, 15, 16, and 18, can be coupled to the printhead 34 such that a portion or segment of the linear array of nozzles is associated with each of the color cartridges. It is also, however, possible that each of the printhead cartridges 14, 15, 16, and 18 can be individually coupled to a single printhead such that each printhead deposits ink on the recording medium 30 of a single color such as cyan, magenta, yellow or black under control of the controller.

Figure 2:
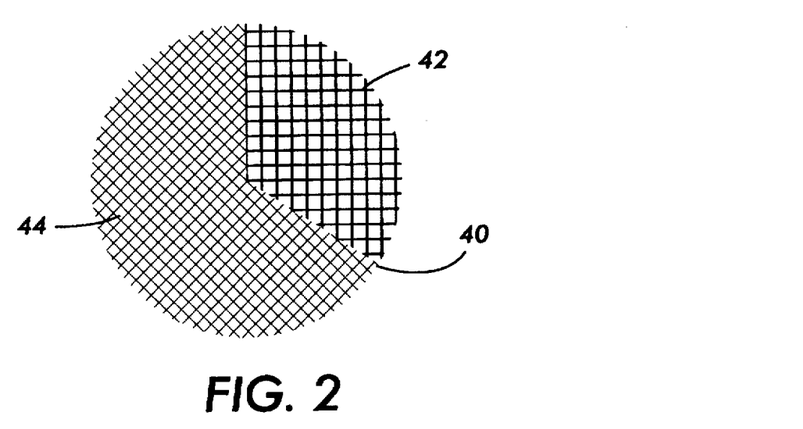
FIG. 2 illustrates a color image having an ink boundary where intercolor bleed can occur.
Figure 3:
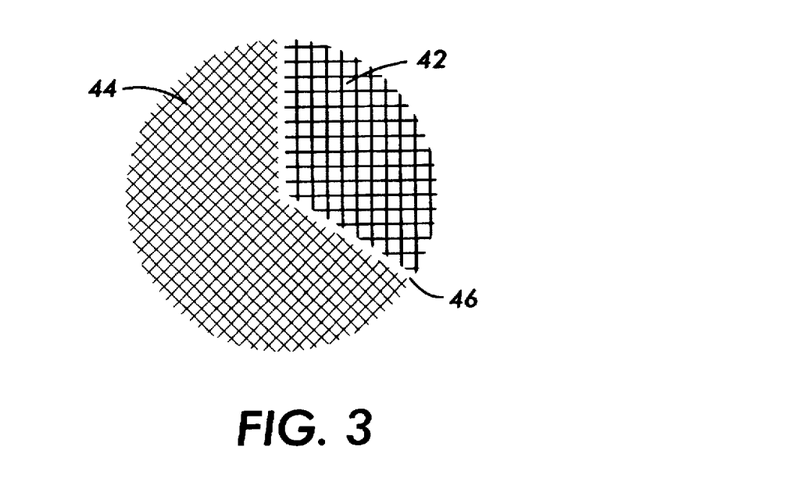
FIG. 3 illustrates the color image of FIG. 2 which has been processed with pixel etching to remove areas of color and/or black located at the ink boundary.

The color printing system 8 of FIG. 1 can be used to print detailed and information intensive color images. Such color images and the printing thereof often involves sophisticated and complex image processing. One example of complex image processing is illustrated in FIGS. 2 and FIGS. 3. As illustrated in FIG. 2, color image processing is often necessary along an intercolor boundary 40 which is located between a first color 42 and a second color 44 which can include black. Along the intercolor boundary, intercolor bleed often occurs especially in liquid ink printers where different colored inks or different types of inks, such as fast drying and slow drying, come in contact with each other and bleed together. Such intercolor bleeding is unacceptable.

One approach to reducing intercolor bleed is illustrated in FIG. 3 and is known as pixel etching. Pixel etching introduces a region 46 where no ink is deposited between the inks. Such a no ink region effectively reduces intercolor bleed as is well known. Unfortunately, however, such boundaries are not only extremely difficult to detect but also difficult to etch. Software exists which detects color boundaries and subsequently processes the necessary pixel etching. This procedure, however, for instance, when performed for an entire page having a resolution of 600 by 600 by 1 byte per pixel can take approximately 20 minutes. For this reason, such implementations are often abandoned or dramatically reduced in complexity thereby creating additional problems where implemented such as in an expensive ASIC with a significant amount of supporting memory.

It has been found, however, that color printers are often sold to different markets or market segments where oftentimes the majority of jobs printed by such color printers have relatively small areas of color, such as in a business setting. Such business documents can be comprised of text with only a small amount of color included in, for instance, a small color logo or a graphic. The present invention, therefore, provides a way to limit the complex color image processing to only those portions of the image which actually require processing. That is, those that contain color. Consequently, even though the present invention includes additional processing steps which do take some amount of time, it is usually insignificant relative to the image processing routines which it replaces.

Figure 4:
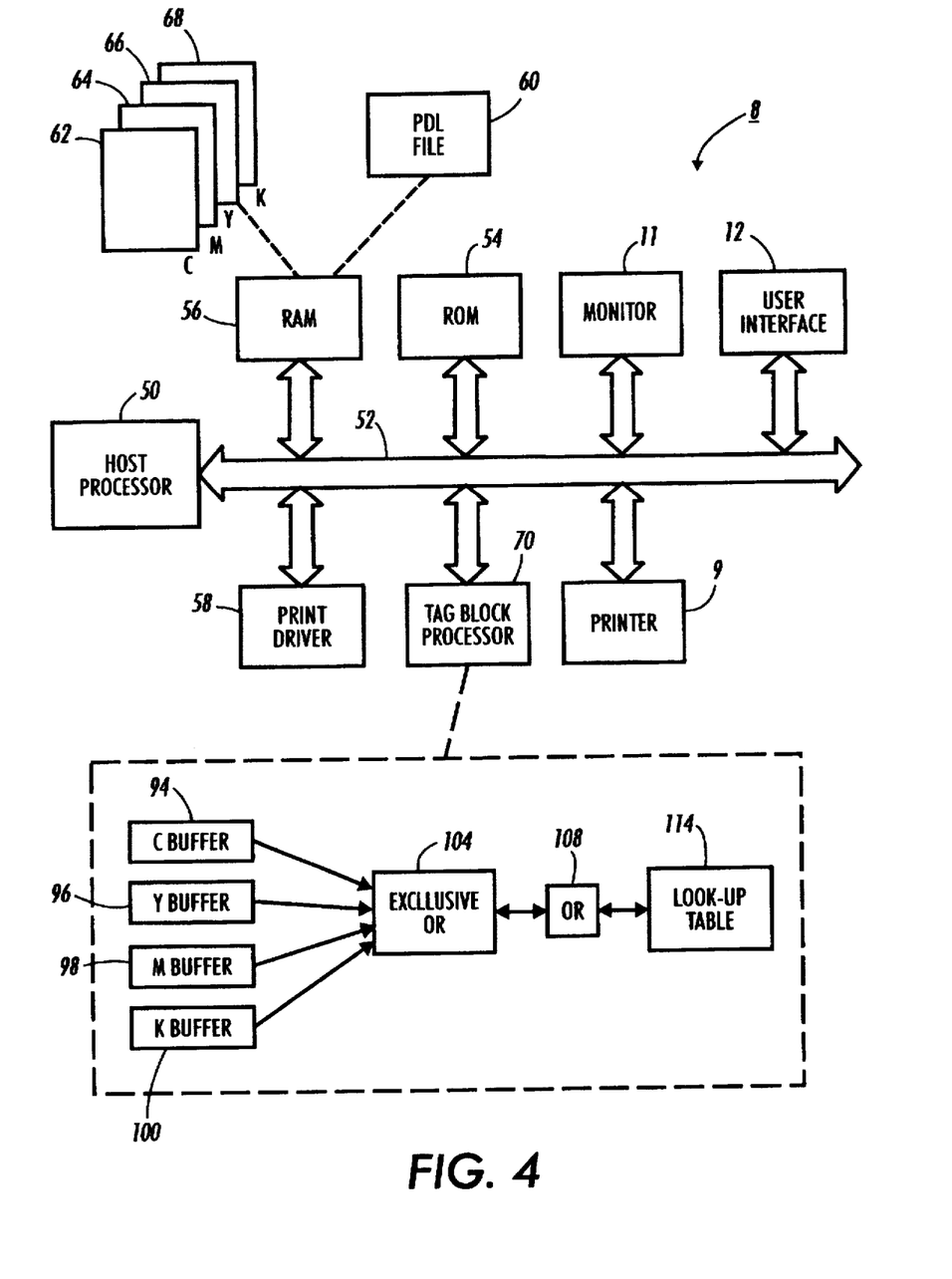
FIG. 4 illustrates a functional block diagram of a printing system including a tag block processor of the present invention.

As illustrated in FIG. 4, the printing system 8 of the present invention includes a host processor 50 located in the personal computer 10 as is known by those skilled in the art. The host processor 50 can include one of many known microprocessors which is programmable through software instructions and is typically connected to a bus 52. Coupled to the bus 52 are other elements of an information processing system including a read only memory (ROM) 54, a Random Access Memory (RAM) 56, the monitor 11, the keyboard 12, also known as a user interface including a mouse and other known interfaces such as touch screen panels, the printer 9, and a print driver 58.

In a typical operation of the printing system 8, a user viewing the monitor 11 creates a document thereon through the user interface 12. Once the document is created through cooperation with the host processor 50, a page descriptive language file (PDL file) 60 is created by the host processor and stored in the Random Access Memory 56.

This PDL file typically includes image information including images which have been defined in colorimetric terms R, G, and B typically digital in nature. The printer 9, however, generates an output image which is defined as existing in a color space known as C, M, Y, and K. Consequently, to print an image existing as a PDL file 60, not only must a transformation from the color space of RGB to the color space of CMY and K be made, but other imaging processing functions such as the previously described pixel etching must be performed. The print driver 58, as is known by those skilled in the art, consequently decomposes or renders the PDL file 60 to create a plurality of bitmaps including a cyan bitmap 62, a magenta bitmap 64, a yellow bitmap 66 and a K or black bitmap 68 which once generated can either be stored in the RAM 56 or transferred to the printer 9 if no additional image processing functions are to be performed by the print driver 58.

Since it has been determined that many color processing operations take a significant amount of time if applied to an entire page of information as described by the PDL file 60, the present invention includes an image segmentation or tag block processor 70, as illustrated in FIG. 4, which in a practical implementation may be included in the print driver 58 but which has been shown separately therefrom for purposes of illustration. The image segmentation processor 70 operates on the C, Y, M and K bitmaps 62, 64, 66, and 68 to determine if any of the information thereon includes color information. The areas of color information are then tagged, such that only those tagged areas are color processed and the remaining areas are not. If a page of information contains no areas which require processing, the tag block processor is not invoked. It is also possible to detect purely black and white pages, of course, even earlier in the image path and any color processing processing is bypassed altogether.

Figure 5:
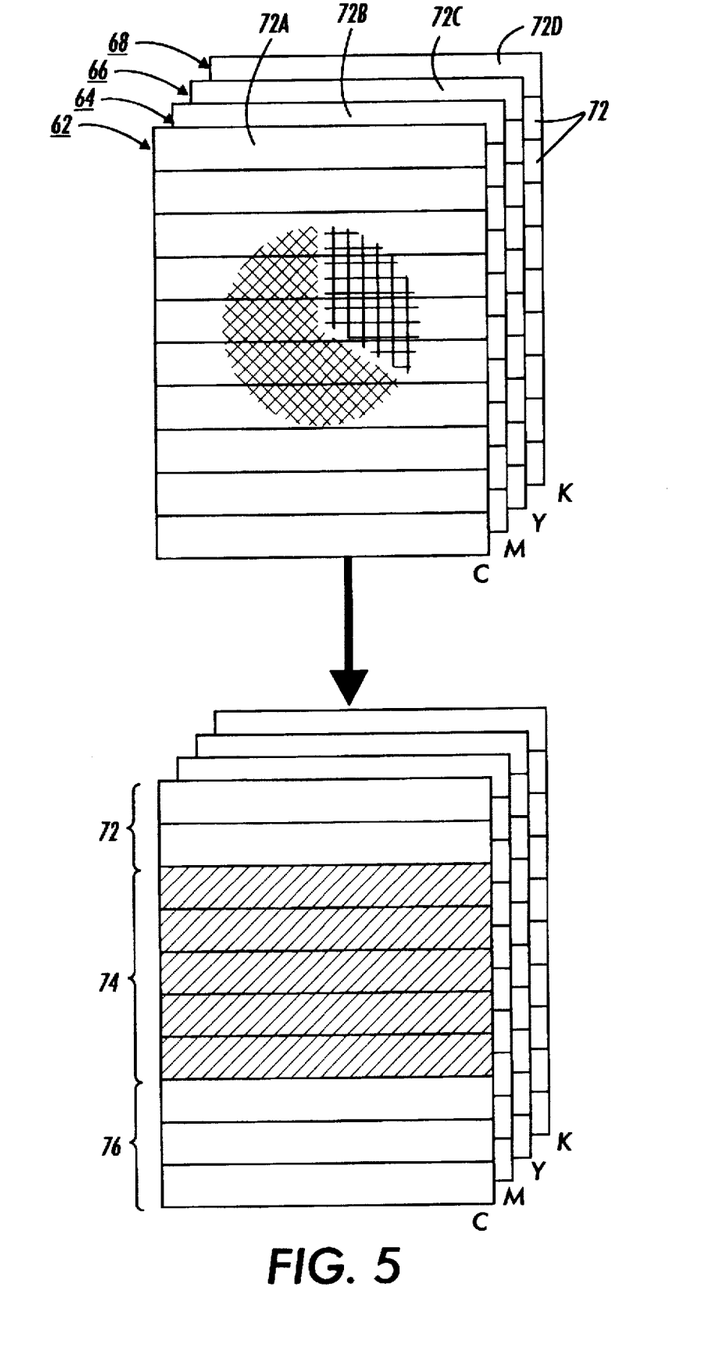
FIG. 5 illustrates one example of a content-dependent image partitioning for use in region dependent image processing of the present invention.

FIG. 5 illustrates a schematic depiction of the operation of the image segmentation processor 70. As illustrated, the combination of the cyan, magenta, yellow and black bitmaps would provide the color image of FIG. 2. Initially, the tag block processor 70 would delineate, or segment, each of the bitmaps into portions each of which corresponds to another similarly sized area from another bitmap. For instance, as illustrated in FIG. 5, the tag block processor 70 divides the bitmaps into a plurality of portions 72 each of which is equivalent to a swath of the printhead printing the entire width of the page. The tag block processor then analyzes each of the portions 72 from a corresponding portion of each of the bitmaps 62, 64, 66 and 68, to determine if there is any color information contained in any of the four corresponding tag blocks such as 72A, 72B, 72C and 72D. If color information is contained therein, the portions containing the color information here illustrated as a block 74 of five swaths is marked or tagged. It is this block 74 which is then color processed according to the desired color processing and the remaining portions of the image including portions 76 and 78 are not color processed.

Figure 6:
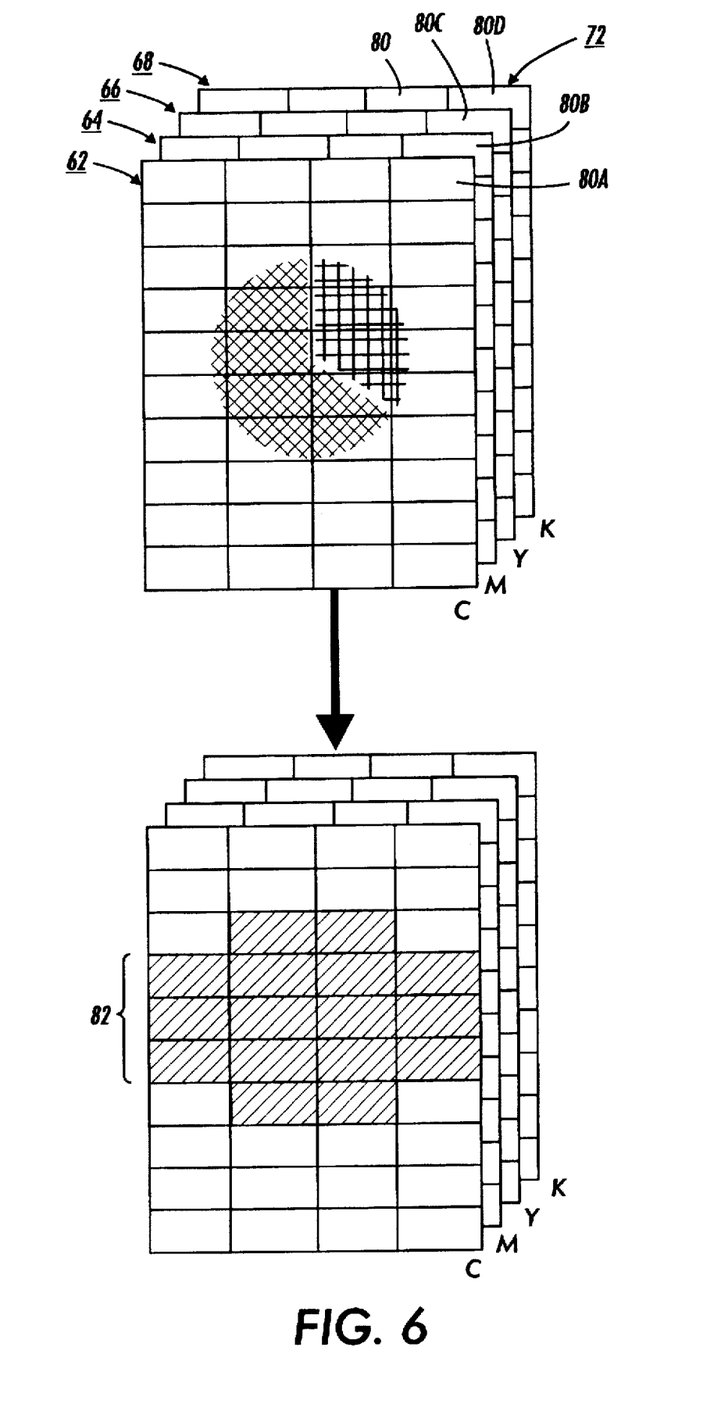
FIG. 6 illustrates a second example of content-dependent image partitioning for use in region dependent image processing of the present invention.

FIG. 6 illustrates a different segmenting scheme of the present invention which includes not only segmenting the pixel bitmaps into a plurality of scan lines but also subdividing each of the scan lines into a plurality of smaller portions which is here illustrated as being a one quarter portion 80 of the portion 72. Corresponding portions of each bitmap are 80A, 80B, 80C and 80D. As before, the plurality of these portions 80 are also marked or tagged when color information is present which is illustrated as an area 82. The remaining areas illustrated as including white space contain no color information and are not color processed. It is possible to select the size of the areas which are to be analyzed for color information therein depending on the type of anticipated use of the printer. The optimum configuration and size of the tag blocks is a function of the hardware and software architecture and the anticipated market' s document demographics. It should be established through experimentation and analysis during the design of the product and coded as a software variable for potential future upgrade as market conditions change.

The tag block processor 70 can include either a hardware implementation or a software implementation according to well known practices. If the tag block processor 70 includes programming operations, it is known and commonplace to program such control functions and any logic with software instructions for conventional or general purpose microprocessors as are included in the printing system 8 of the present invention. This is taught by many various prior patents and commercial products. Such programming or software may, of course, vary depending on the particular functions, software type, and microprocessor or other computer or other system utilized but will be available to or readily programmable without undue experimentation from, functional descriptions such as those provided herein, or prior knowledge of functions which are conventional together with general knowledge in the software and computer arts. This can include object oriented software development operation environments such as C++. Alternatively, the disclosed system or method may be implemented partially or fully in hardware using standard logic circuits or a single chip using VLSI designs.

Figure 7:
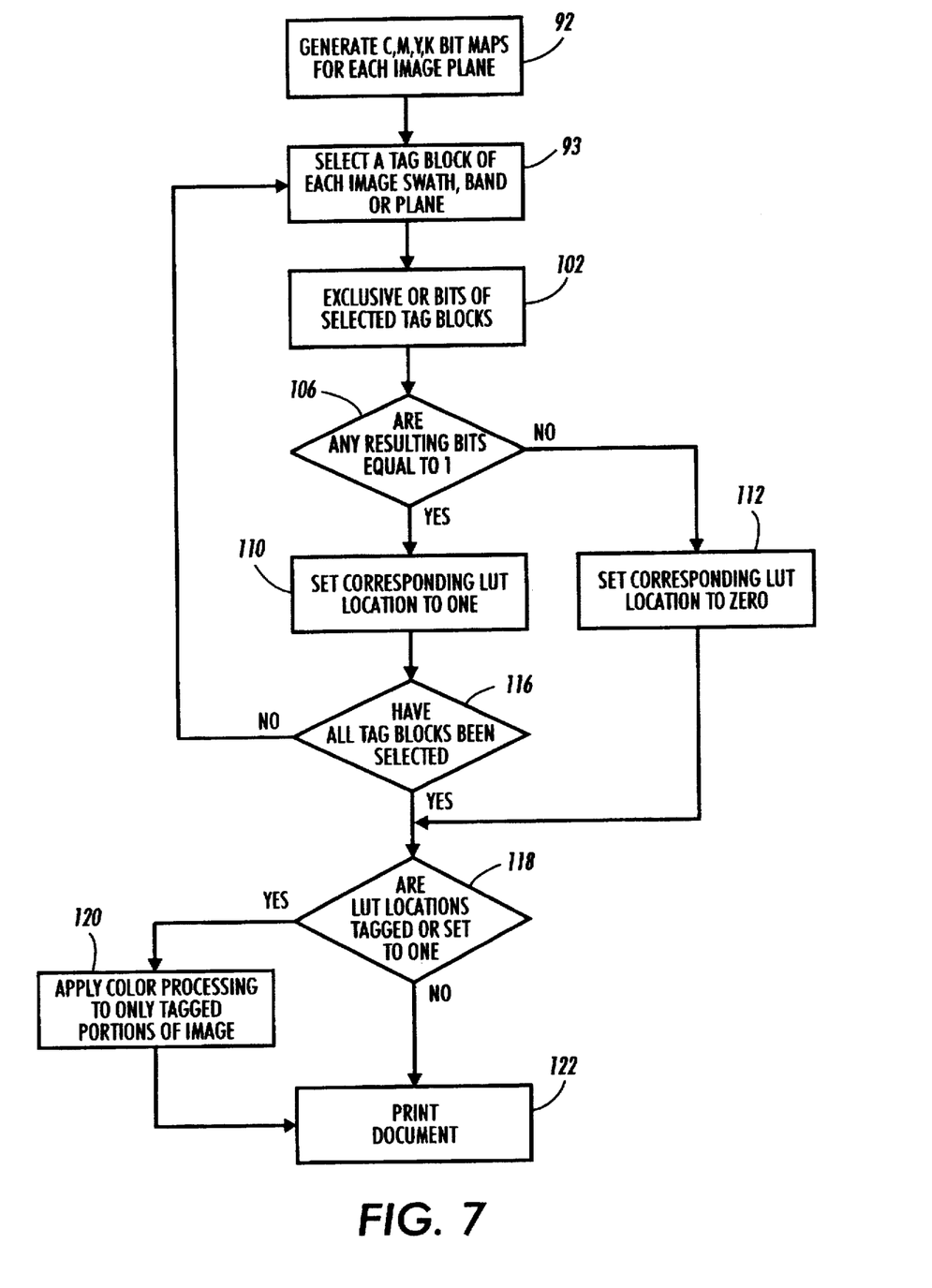
FIG. 7 illustrates a flow chart for the region dependent image processing method of the present invention.

FIG. 7 illustrates a flow chart for the operations performed by the tag block processor 70, either implemented in software or as hardware. The cyan, magenta, yellow and black bitmaps are generated for each image plane from the PDL file 60 as illustrated at step 92. After bitmaps for each image plane have been generated and the tag block size has been determined, a first tag block from each of the image planes is selected such that each of the selected tag blocks corresponds to a certain portion of the printed image. These portions can be stored in related buffers as illustrated in FIG. 4 where a cyan buffer 94, a yellow buffer 96, a magenta buffer 98, and a black buffer 100 receive corresponding portions of each of the image planes. The size of these buffers can be equivalent to the size of the tag blocks or can be of other sizes depending on the implementation. Once a tag block has been selected for each image plane at step 93, a logical exclusive OR operation is applied to corresponding bytes of the selected tag blocks as illustrated at step 102 and as embodied by the exclusive OR operator 104 of FIG. 4. In an actual implementation, thirty-two bit segments of the tag blocks might be logically exclusively ORed together to determine whether or not any of the portions contain color information since thirty-two bit words in known personal computers are common. It is also possible, however, to exclusive OR a single bit from each of the tag blocks until it is determined that color is included within a tag block. Once color is found in one or more bitmaps, the next tag block can be examined. It is not necessary to exclusive OR every pixel of a tag block but only to exclusive OR pixels of a tag block until at least one result indicates that color information is contained within a tag block. At step 106, it is determined whether or not any resulting bits from the logical operation are equivalent to a 1. If, for instance, 32 bit words are exclusively ORed together by operator 104 then the resulting 32 bits from the logical operation of exclusively ORing all four planes together would result in a single 32 bit word. In this case, all 32 bits could be ORed together at OR gate 108 to determine if color has been found thereby providing an output of a 1 if so determined.

Since a plurality of corresponding tag block portions are analyzed to determine whether or not color information is contained therein, a lookup table is established by either the host processor 50 under control of the print driver 58 or the tag block processor 70 to store indicating bits to indicate which of the tag block portions contain color information. Consequently, once any resulting bits are determined to be equal to 1 at step 106, a corresponding lookup table location is set to 1 at step 110. If, however, none of the resulting bits are equal to 1 at step 106, then the corresponding lookup table location is set to 0 at step 112 and as embodied in the lookup table 114 of FIG. 4. At step 116, if it is determined that all of the tag blocks have not been selected, then a new tag block is selected at step 93 and the previously described operations are repeated for the newly selected tag block. If, however, all of the tag blocks have been selected and thus analyzed, the lookup table locations in the lookup table 114 are checked at step 118 to determine if any lookup table locations indicate that the previously analyzed tag blocks include color information. If, yes, then at step 120 color processing is applied to only the tagged portions of the image. Once the color processing has been completed, then the document is printed at step 122. Of course, if none of the lookup table locations 118 were tagged or set to a one at step 118, then the document is printed at step 122 without the application of any additional color processing.

It has been found that the region-dependent image processing of the present invention significantly reduces the amount of time required for image processing by preanalyzing the entire page and identifying only the regions which need to be processed. In one example, it has been found that the present invention reduced the image processing time from approximately 40 seconds to less than one second. While it is possible that processing a color image covering a complete page might increase the processing time for that page using the present invention, overall processing time for color processing many documents decreases using the present invention. It is, therefore, apparent that there has been provided in accordance with the present invention a printing system having region dependent image processing that fully satisfies the aims and advantages hereinbefore set forth. While this invention has been described in conjunction with a specific embodiment thereof, it is evident that many alternatives, modifications, and variations will be apparent to those skilled in the art. For instance, the tag block processing or segmentation can be done by collecting and merging bounding box information in the PDL interpreter or the PDL interpreter could be modified to generate the bounding box information as it is decomposing the image. Or in the alternative, the output of the interpreter can be scanned to generate the same bounding box information. In addition, the present invention is not limited to liquid ink printers but is equally applicable to other printing systems such as four color offset and xerographic printing systems. For instance, such systems use trapping algorithms for which the present invention could be advantageously applied. Accordingly, it is intended to embrace all such alternatives, modifications and variations that fall within the spirit and broad scope of the appended claims.

What is claimed is:

1. A method of printing a color image with a printer from image information generated by an image source, comprising:

generating a plurality of bitmaps from the image information;

examining a corresponding portion of each of the plurality of bitmaps for color information;

generating a tag for the examined corresponding portion having color information by logically exclusively ORing the corresponding portion of each of the plurality of bitmaps to generate the tag;

applying color image processing to only the examined corresponding portion having color information having the stored generated tag;

printing the color image according to the applied color image processing;

storing the generated tag in a memory; and examining the memory to determine whether the examined corresponding portion includes the generated tag.

2. The method of claim 1, wherein said examining step comprises examining the corresponding portion of each of the plurality of bitmaps for color information, the corresponding portion being equivalent to a single swath of a liquid ink printhead.

3. The method of claim 1, wherein said examining step comprises examining the corresponding portion of each of the plurality of bitmaps for color information, the corresponding portion being equivalent to a portion of a single swath of the printhead.

4. A method of printing a color image with a printer from image information generated by an image source, comprising:

generating a plurality of bitmaps from the image information;

examining a plurality of corresponding portions of each of the plurality of bitmaps for color information by examining one of the plurality of corresponding portions until the presence of color information is determined by examining corresponding bits of the plurality of bitmaps by applying a logical exclusive OR operation to the corresponding bits;

secondly examining a succeeding one of the plurality of corresponding portions after the presence of color information is determined in the examined one of the lurality of corresponding portions;

applying color image processing to only the examined corresponding portion having color information; and printing the color image according to the applied color image processing.

5. The method of claim 4, comprising generating a tag for the examined corresponding portion determined to include color information as a result of the logical exclusive OR operation.

6. The method of claim 5, comprising storing the generated tag in a memory.

7. The method of claim 6, comprising examining the memory to determine whether the examined corresponding portion includes generated tag.

8. The method of claim 7, wherein said applying step comprises applying color image processing to only the examined corresponding portion having a stored generated tag.

* * * * *